(12) United States Patent
Porter et al.

(10) Patent No.: US 8,846,803 B2
(45) Date of Patent: Sep. 30, 2014

(54) RUBBER ADHESIVE COMPOSITIONS CONTAINING VINYL PYRIDINE LATEX POLYMERS WITH ALTERNATE NITROGEN MONOMERS

(75) Inventors: Norman K. Porter, North Canton, OH (US); Carla B. Dittman McBain, Sharon Center, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 129 days.

(21) Appl. No.: 13/511,732

(22) PCT Filed: Nov. 24, 2010

(86) PCT No.: PCT/US2010/058003
§ 371 (c)(1),
(2), (4) Date: May 24, 2012

(87) PCT Pub. No.: WO2011/066385
PCT Pub. Date: Jun. 3, 2011

(65) Prior Publication Data
US 2013/0000844 A1  Jan. 3, 2013

Related U.S. Application Data

(60) Provisional application No. 61/264,093, filed on Nov. 24, 2009.

(51) Int. Cl.

| | | |
|---|---|---|
| *C09J 161/00* | (2006.01) | |
| *C09J 161/10* | (2006.01) | |
| *C09J 161/24* | (2006.01) | |
| *C09J 161/28* | (2006.01) | |
| *C09J 109/08* | (2006.01) | |
| *C09J 147/00* | (2006.01) | |
| *C09J 133/24* | (2006.01) | |
| *C09J 139/08* | (2006.01) | |
| *C08L 19/02* | (2006.01) | |
| *C08L 9/06* | (2006.01) | |
| *C08L 39/08* | (2006.01) | |
| *C08L 33/24* | (2006.01) | |
| *C09J 119/00* | (2006.01) | |
| *B60C 1/00* | (2006.01) | |
| *C08L 61/06* | (2006.01) | |
| *C08L 61/12* | (2006.01) | |

(52) U.S. Cl.
CPC .............. *C09J 109/08* (2013.01); *C08L 61/06* (2013.01); *C08L 61/12* (2013.01); *C09J 119/006* (2013.01); *Y02T 10/862* (2013.01); *B60C 1/00* (2013.01)
USPC .......... 524/510; 524/501; 524/596; 526/346; 526/340; 526/335; 526/303.1; 526/307.3; 526/307.5; 526/310; 526/263

(58) Field of Classification Search
USPC .......... 524/510, 501, 596; 526/346, 340, 335, 526/303, 1, 304, 307.3, 307.5, 310, 263
See application file for complete search history.

(56) References Cited

U.S. PATENT DOCUMENTS

| | | | |
|---|---|---|---|
| 3,644,256 A | 2/1972 | Broisman | |
| 3,707,178 A | 12/1972 | Miller et al. | |
| 3,716,396 A | 2/1973 | Shirano et al. | |
| 3,922,426 A | 11/1975 | Feltzin | |
| 3,931,088 A | 1/1976 | Sakurada et al. | |
| 3,968,295 A | 7/1976 | Solomon | |
| 4,017,434 A | 4/1977 | Suzui et al. | |
| 4,078,115 A | 3/1978 | Langer et al. | |
| 4,204,982 A | 5/1980 | Neubert | |
| 4,239,800 A | 12/1980 | Girgis | |
| 4,248,938 A | 2/1981 | Takata et al. | |
| 4,263,190 A | 4/1981 | Zavisza | |
| 4,300,615 A | 11/1981 | Kavchok | |
| 4,300,964 A * | 11/1981 | Chaudhuri ................ 156/110.1 |
| 4,318,960 A | 3/1982 | McCombs et al. | |
| 4,405,746 A | 9/1983 | Girgis | |
| 4,448,813 A | 5/1984 | Solomon | |
| 4,963,613 A | 10/1990 | Toyoda et al. | |
| 5,176,781 A | 1/1993 | Mori et al. | |
| 5,219,902 A | 6/1993 | Mishima et al. | |
| 5,565,507 A * | 10/1996 | Marco et al. ................ 523/413 |
| 6,468,654 B1 | 10/2002 | Okamura et al. | |
| 6,860,962 B2 | 3/2005 | Pelton | |
| 2004/0261928 A1 | 12/2004 | Imhoff et al. | |

OTHER PUBLICATIONS

PCT Search Report for International Application No. PCT/US2010/058003 mailed on Aug. 26, 2011.

\* cited by examiner

*Primary Examiner* — Satya Sastri
(74) *Attorney, Agent, or Firm* — Kagan Binder, PLLC; David G. Burleson

(57) ABSTRACT

The invention relates to polymeric latexes that can be used in adhesive compositions, which provide improved bonding of rubber articles to rubber reinforcing articles. The adhesive composition includes a single or a blend of polymeric latexes comprising a conjugated aliphatic monomer, a vinylaromatic monomer, a vinylpyridine monomer, and a nitrogen-containing monomer comprising a reactive N-methylol- or N-alkoxy-functionality. Use of the monomer comprising a nitrogen-containing monomer comprising a reactive N-methylol- or N-alkoxy-functionality allows for reduced amounts of the vinylpyridine monomer in the latex, and enhances the bonding properties of the adhesive composition. Use of the adhesive composition provides economic and chemical advantages for the preparation of reinforced rubberized articles.

20 Claims, No Drawings

RUBBER ADHESIVE COMPOSITIONS CONTAINING VINYL PYRIDINE LATEX POLYMERS WITH ALTERNATE NITROGEN MONOMERS

PRIORITY CLAIM

This application claims benefit from International Application No. PCT/US2010/058003, which was filed on Nov. 24, 2010, which in turn claims priority to U.S. Provisional Application No. 61/264,093, filed on Nov. 24, 2009; wherein the entireties of said patent applications are incorporated herein by reference.

BACKGROUND

Many rubber articles are reinforced with textiles that are made of filamentous materials. Textile reinforced rubber articles have improved strength and durability as compared to rubber articles without any reinforcement. This reinforcement allows rubbers to be used in more demanding applications, such as ones where the rubber article is subjected to considerable movement, high friction, and temperature extremes. Reinforced rubbers are commonly found in vehicle and airplane tires, conveyor and engine belts, and hoses.

Formaldehyde resin/latex-based adhesives are frequently used for adhering a reinforcing textile to rubber. The adhesive materials are able to establish strong adherence between the textile and rubber materials through a combination of physical and chemical interactions. For example, the latex adhesive layer forms encapsulating structures and holds the fibers of the reinforcing material and rubber particles together. The strong adherence between the materials facilitated by the adhesive provides a layered composite that is tough and durable, and prevents mechanical failure of the rubber article.

Adhesives providing good bonding properties have been prepared from vinyl-pyridine rubber latex reacted with resorcinol formaldehyde to form a condensate. The vinyl pyridine content in a latex polymer can provide chemical characteristics that promote excellent adhesive properties in rubber reinforcing applications.

One disadvantage, however, is that vinyl pyridine (VP) is an expensive starting material. Use of a VP-based adhesives significantly increases the price of a reinforced rubber article versus one that does not use a VP-based adhesive. On the other hand, reducing the amount of VP in the latex can reduce the adhesive properties of the latex, and lead to mechanical failure of the reinforced article.

One alternative approach to improve adhesion between the textile reinforcing portion and the rubber portion uses pre-coated fiber materials, such as polyester fibers coated with an epoxy compound. However, the additional materials and process steps involved can also increase product cost.

Another problem in the production of textile reinforced rubber articles is that encapsulation characteristics of a latex adhesive can limit the type of textiles used to produce well-reinforced rubber articles. For example, is difficult to adhere polyester to rubber with a resorcinol-formaldehyde resin latex adhesive. Nylon, on the other hand, is typically used as the reinforcing fabric because it permits strong adhesion between the resin of the latex adhesive composition through encapsulation. However, nylon may not be a desired reinforcing material for certain applications. For example, as compared with polyester, nylon is much more expensive as a reinforcing material. Also, some polyaramid textiles, such as Kevlar™ (like polyester), are difficult to adhere to rubber with a resorcinol-formaldehyde resin latex adhesive. Although many of these polyaramid textiles could potentially provide very strong reinforcements and would desirable for forming reinforced rubber articles, there use is limited by the latex adhesive systems of the prior art.

SUMMARY

Aspects of the invention generally relate to polymeric latexes, as well as methods for their production. Aspects of the invention also relate to adhesive compositions that include the polymeric latexes, methods for bonding rubber articles to rubber reinforcing articles, and also the bonded products formed from such compositions and methods. The polymeric latexes improve the adhesion between the bonded materials, and a broader range of reinforcing materials can be used.

Generally, the adhesive compositions include a single latex polymer or a blend of latex polymers. In the adhesive composition the single latex polymer or blend of latex polymers comprise a conjugated aliphatic monomer, a vinylaromatic monomer, a vinylpyridine monomer, and a nitrogen-containing monomer comprising a reactive N-methylol- or N-alkoxy-functionality.

Overall, the conjugated aliphatic monomer is the primary monomer in the single or blend of latex polymer(s) by weight in the adhesive composition. The vinylpyridine monomer and nitrogen-containing monomer comprising a reactive N-methylol- or N-alkoxy-functionality are present in the single or blend of latex polymer(s) in a combined amount of less than 20 weight percent.

If a blend is used, the amounts of monomers are present in a blend of two latex polymers. A first latex polymer is formed from at least a conjugated aliphatic monomer, a vinylaromatic monomer, and a vinylpyridine monomer. A second latex polymer is formed from at least a conjugated aliphatic monomer, a vinylaromatic monomer, and a nitrogen-containing monomer comprising a reactive N-methylol- or N-alkoxy-functionality. The aqueous latex adhesive composition containing the single or blend of latex polymer(s) can also include a resin (for example, a resorcinol-formaldehyde resin) which can be reacted with the latex to provide a condensate.

The use of an adhesive composition including a latex polymer formed using a monomer containing the reactive N-methylol- or N-alkoxy-functionality has been found to be particularly advantageous for bonding rubber articles to rubber-reinforcing articles. It overcomes technical problems associated with suboptimal adhesion between rubber articles and rubber-reinforcing articles, and also provides an economic advantage.

The reactive N-methylol- or N-alkoxy-functionality of the latex polymer allows reaction with the resin (for example, a resorcinol-formaldehyde resin). This strengthens the adhesive material. Also, the amine chemistry of the reactive N-methylol- or N-alkoxy-functionality allows for hydrogen bonding with material of the rubber-reinforcing article (such as a polyester or nylon reinforcing material of tire cord). This provides a better bond between the reinforcing material and the adhesive. Overall, this produces excellent adhesion between the rubber article and the rubber-reinforcing article, through the improved chemistries. An adhesive including a latex of the invention can be used with a broader range of reinforcing materials, including those such as polyester which has previously been shown to be more problematic for forming good bonding.

Further, the use of monomers with an N-methylol- or N-alkoxy-functionality allows for a significant reduction in the overall amount of vinyl pyridine in a single latex polymer, or blend of latex polymers, without compromising the adhesive properties of an adhesive composition. In other words, an amount of vinyl pyridine is replaced with the monomer having the N-methylol- or N-alkoxy-functionality, which serves as an alternative nitrogen source in the latex polymer. This replacement and reduction allows the latex polymer to be produced at lower cost, while still providing adhesive properties similar to polymeric latexes prepared with greater amounts of VP.

Exemplary latex polymers are formed from styrene (S), butadiene (B), vinyl pyridine (VP), and the monomer having a reactive N-methylol- or N-alkoxy-functionality, such as N-methylol methacrylamide (NMMA) or N-methylol acrylamide (NMA). In one particular aspect, the invention provides a latex polymer, or blend of latex polymers, comprising butadiene in an amount in the range of 40 weight percent to 85 weight percent, styrene in an amount in the range of 10 weight percent to 40 weight percent, a vinylpyridine monomer in an amount in the range of 4 weight percent to 10 weight percent, and a nitrogen-containing monomer comprising a reactive N-methylol- or N-alkoxy-functionality in an amount in the range of 0.1 weight percent to 3.5 weight percent.

In another aspect, the invention provides a method for preparing reinforced rubberized articles. The method includes a step of bonding a rubber article to a rubber reinforcing article with an adhesive composition comprising a latex polymer or blend of latex polymers, the latex polymer(s) comprising a conjugated aliphatic monomer, a vinylaromatic monomer, a vinylpyridine monomer, and a nitrogen-containing monomer comprising a reactive N-methylol- or N-alkoxy-functionality; wherein the conjugated aliphatic monomer is the primary monomer in the latex polymer by weight, and the vinylpyridine monomer and the nitrogen-containing monomer comprising a reactive N-methylol- or N-alkoxy-functionality are present in the composition in a combined amount of less than 20 weight percent.

In another aspect the invention provides a reinforced rubberized article. The article includes a rubber portion, a rubber reinforcing portion, and an adhesive composition bonding the rubber portion to the rubber reinforcing portion. The adhesive composition comprises a latex polymer, or blend of latex polymers, comprising a conjugated aliphatic monomer, a vinylaromatic monomer, a vinylpyridine monomer, and a nitrogen-containing monomer comprising a reactive N-methylol- or N-alkoxy-functionality; wherein the conjugated aliphatic monomer is the primary monomer in the latex polymer(s) by weight, and the vinylpyridine monomer and the nitrogen-containing monomer comprising a reactive N-methylol- or N-alkoxy-functionality are present in the composition in a combined amount of less than 20 weight percent.

DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Percentages of polymerizable and non-polymerizable components used to form the latexes are based on the total weight of the polymerizable components in the system, unless otherwise noted.

The invention relates to adhesive compositions comprising latex polymers and the preparation thereof. The invention is also directed to methods for adhering substrates together using the latex polymer-containing adhesive compositions, as well as the articles that are formed using from the adhesion process.

More specifically, and in some embodiments, a latex polymer is formed from a combination of monomers, which include a conjugated aliphatic monomer (which is the primary monomer in the latex polymer by weight), a vinylaromatic monomer, a vinylpyridine monomer, and a nitrogen-containing monomer comprising a reactive N-methylol- or N-alkoxy-functionality. The vinylpyridine monomer and a nitrogen-containing monomer comprising a reactive N-methylol- or N-alkoxy-functionality are present in an amount in the formed polymer of 20 weight percent or less. Use of a nitrogen-containing monomer comprising a reactive N-methylol- or N-alkoxy-functionality allows the reduction in the amount of vinylpyridine.

In some embodiments, the combination of monomers is provided by a blend of latex polymers. For example, in some embodiments the adhesive composition can have a blend of two latex polymers, with one (e.g., a first) latex polymer including a conjugated aliphatic monomer, a vinylaromatic monomer, and a vinylpyridine monomer, and another (e.g., a second) including a conjugated aliphatic monomer, a vinylaromatic monomer, and a nitrogen-containing monomer comprising a reactive N-methylol- or N-alkoxy-functionality. Looking at the combined monomeric content among the blend of the two latex polymers, the conjugated aliphatic monomer remains the primary monomer by weight. The vinylpyridine monomer and the nitrogen-containing monomer comprising a reactive N-methylol- or N-alkoxy-functionality are present in the blend in an amount of 20 weight percent or less.

A latex polymer of the invention having this reactive functionality of can be reactive with the resorcinol-formaldehyde in the adhesive composition, and can also hydrogen-bond with the material of the rubber reinforcing material, such as polyester or the nylon. This provides an economic advantage as well as bonding advantages between a rubber article and a rubber-reinforcing article.

Latexes generally refer to stable dispersions of polymer microparticles in a liquid medium, typically an aqueous solution. Latexes of synthetic poymers are commonly produced by emulsion polymerization using initiators, surfactants, and monomers.

Latex particles typically have certain sizes and the preparation of the latexes can be controlled to provide a desired particle size. Exemplary particles sizes for the latex polymer preparations of the current invention are in the range of about 30 nm to about 300 nm, although large or smaller particles sizes can be prepared and used for an adhesive composition, such as one described herein. Particles sizes can be determined by standard techniques, such as microphotography. It is generally thought in the art of rubber-textile bonding that smaller particle size can promote permeation of the latex into the fibers of the reinforcing textile. The invention contemplates use of latex particles of various sizes, including small and large, and including those within the size range as described herein.

The latex particles can be prepared to have a desired particle morphology, such as an individual particle, a core shell, an inverted core shell, or a hemispherical particle. The particle morphology can be controlled by factors such as use of seeded emulsion polymerization techniques, volume ratio of seeded to polymerizable components, interfacial tension of materials in the polymerization batch (which can be affected by the type and/or amount of one or more surfactants), and the initiator type and amount (the initiator can have an affect on the particle surface polarity, and can change the polymer phase/water interfacial tension). See Chen, Y.-C., and Dimonie, V. (1992) *Theoretical aspects of developing particle morphology*. Pure & Appl. Chem. 64:1691-1696.

A latex polymer can be formed in a process wherein the monomer components are added at the same time, or at different times, during the polymerization process. The presence of these monomeric components is not limited to the particular various polymer structures that may arise from different polymerization methods.

The total amount of monomeric components in the latex polymer, or latex polymers, used to form the adhesive compositions is described by weight percent (parts weight). In embodiments using a single latex polymer that includes the conjugated aliphatic monomer, a vinylaromatic monomer, a vinylpyridine monomer, and the nitrogen-containing monomer comprising a reactive N-methylol- or N-alkoxy-functionality, the weight percent can be determined by the amounts of the monomeric materials used to form the latex polymer. For example, for an adhesive composition that uses 1000 g of a latex polymer made using 200 g of styrene, styrene constitutes 20 weight percent of the latex polymer.

In the embodiments where two (or more) latex polymers are included in an adhesive composition, the monomer ranges can be calculated by the total amounts of monomeric materials used to form the two (or more) latex polymer. For example, for an adhesive composition that uses 600 g of a first latex polymer (e.g., S-B-VP) made using 100 g of styrene, and 400 g of a second latex polymer (e.g., S-B-NMA) made using 80 g of styrene, styrene constitutes 18 weight percent of the latex polymers.

The primary monomer in the latex polymer or blend of polymers is a conjugated aliphatic diene monomer. A conjugated aliphatic diene is a compound which includes two double bonds in an aliphatic chain of carbon atoms, the double bonds being separated by a single bond. Conjugated aliphatic diene monomers include those selected from 1,3-butadiene, 2-methyl-1,3-butadiene (isoprene), 2,3-methyl-1,3-butadiene, 1,4-pentadiene, 1,3-pentadiene, 1,4-cyclohexadiene, 1,3-cyclohexadiene, and the like. In some aspects the latex polymer is prepared using a butadiene monomer.

Optionally, the conjugated aliphatic diene can include a non-hydrogen or non-carbon atom substituted in place of a hydrogen atom either in the aliphatic chain containing the conjugate, dougle-bonded carbon atoms, in a side chain linked to the aliphatic chain, or in a ring structure linked to the aliphatic chain. For example, if used, a non-hydrogen or non-carbon substituted atom can be selected from a halogen, such as chlorine, flourine, and bromine.

If desired, more than one diene is used to form the latex polymer. For example, the conjugated aliphatic diene component can also be represented by a mixture of different conjugated aliphatic dienes, such as 1,3-butadiene and isoprene.

As the "primary" monomer in the latex polymer, the conjugated aliphatic diene is present in an amount greater than any other monomer component used to form the latex polymer, or polymers, if two or more latex polymers are present. In one aspect, the conjugated aliphatic diene monomer, such as butadiene, is present in the latex polymer(s) in an amount of 55 weight percent or greater. In more specific aspects, the conjugated aliphatic diene monomer is present in the latex polymer(s) in an amount in the range of 65 weight percent to 80 weight percent.

The latex polymer also includes a vinyl aromatic monomer. A vinyl aromatic monomer is a compound which includes an aromatic ring structure having at least one group pendent from the ring structure that includes an ethylenically unsaturated group. Vinyl aromatic monomers include, but are not limited to styrene, $\alpha$-methylstyrene, vinyl toluene, ethyl styrene, propyl styrene, vinyl biphenyl, vinyl naphthalene, and vinyl anthracene.

Optionally, the vinyl aromatic monomer can also include one or more other group(s) pendent from the ring structure (other than the one that includes the ethylenically unsaturated group), and which includes a non-hydrogen or non-carbon atom. For example, the other group(s) can include an atom selected from a halogen, such as chlorine, flourine, bromine, etc.

Optionally, more than one vinyl aromatic monomer can be used to form the latex polymer. For example, the vinyl aromatic monomer can be represented by a mixture of different vinyl aromatic monomers.

The vinyl aromatic monomer is present in the latex polymer(s) in an amount less than the conjugated aliphatic diene monomer. In one aspect, the vinyl aromatic monomer, such as styrene, is present in the latex polymer(s) in an amount of about 10 weight percent to about 40 weight percent. In more specific aspects, the vinyl aromatic monomer is present in the latex polymer(s) in an amount in the range of about 14 weight percent to about 20 weight percent.

The latex polymer(s) also includes a vinyl pyridine monomer. Exemplary vinyl pyridine monomers include 2-vinylpyridine, 4-vinylpyridine, 2-methyl-5-vinylpyridine, and 5-ethyl-2-vinylpyridine. Mixtures of vinyl pyridine monomers can also be used.

The vinyl pyridine monomer can be used in an amount less than the amount of vinyl pyridine used in conventional latex polymer formulations. The ability to use lower amounts of vinyl pyridine monomer is facilitated by the presence of the nitrogen-containing monomer comprising a reactive N-methylol- or N-alkoxy-functionality, which both substitutes for the vinyl pyridine and improves aspects of bonding when the inventive latex is used in an adhesive composition. In some aspects, the vinylpyridine monomer is present in the latex polymer in an amount in the range of about 4 weight percent to about 15 weight percent. In more specific aspects, the vinylpyridine monomer is present in the latex polymer in an amount in the range of about 5 weight percent to about 9 weight percent.

If a blend of conjugated aliphatic-vinylaromatic monomer latexes is used, in some aspects, the vinyl pyridine monomer is present in a first latex polymer, and separately, the monomer comprising the nitrogen-containing monomer comprising a reactive N-methylol- or N-alkoxy-functionality is present in a second latex polymer.

Generally, the nitrogen-containing monomer comprising a reactive N-methylol- or N-alkoxy-functionality is used in an amount sufficient to substitute for the reduction in the vinylpyridine monomer content and improve aspects of bonding when the latex polymer is used as an adhesive.

In some aspects, the nitrogen-containing monomer comprising a reactive N-methylol- or N-alkoxy-functionality is present in the latex polymer in an amount in the range of about 0.1 or 0.5 weight percent to about 3.5 weight percent. In more specific aspects, the nitrogen-containing monomer is present in the latex polymer in an amount in the range of about 1.0 weight percent to about 2.5 weight percent, and in even more specific aspects, in the range of about 1.5 weight percent to about 2.1 weight percent.

Exemplary adhesive compositions include a single or blend of latex polymer(s), wherein the vinyl pyridine monomer is present in an amount in the range of about 5 weight percent to about 9 weight percent, and the nitrogen-containing monomer comprising a reactive N-methylol- or N-alkoxy-functionality is present in an amount in the range of about 0.5 weight percent to about 3.5 weight percent. For example, a synergistic adhesive effect was observed in a latex composition with vinyl pyridine monomer at about 7 weight percent, and NMA at about 1.8 weight percent. In some aspects, the monomer comprising a reactive N-methylol- or N-alkoxy-functionality has the following Formula I:

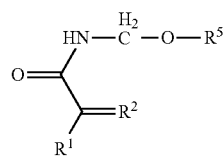

wherein $R_1$ is H or is a $C_1$ to $C_6$ alkyl radical; $R^2$ is —$CH_2$ or —$CH(CH_2)_x CH_3$ wherein x is 0 or 1-5; and $R^5$ is a $C_1$ to $C_{22}$ alkyl radical. In more specific aspects $R^5$ is a $C_1$ to $C_{12}$ alkyl radical, or a $C_1$ to $C_6$ alkyl radical.

Exemplary monomers of Formula I include N-(alkoxymethyl)acrylamides and N-(alkoxymethyl)methacrylamides, N-methylol acrylamide (NMA) and N-methylol acrylamide (NMA), such as wherein the alkoxy group of the monomers is represented by a $C_1$ to $C_{22}$ alkyl radical, a $C_1$ to $C_{12}$ alkyl radical, or a $C_1$ to $C_6$ alkyl radical.

Examples of N-(alkoxymethyl)acrylamides and N-(alkoxymethyl)methacrylamides include N-(isobutoxymethyl)acrylamide and N-(isobutoxymethyl)methacrylamides. Combinations of reactive monomers comprising different N-methylol- or N-alkoxy-functionalities can be used to form a single latex polymer, or blend of latex polymers.

Polymers prepared using the monomers of Formula I can provide latex polymers wherein the —O—R group provides a reactive functionality on the polymer. The —O—R group, when included in a composition, can be reactive with active hydrogen-containing groups of one or more other components in the adhesive composition, such as free carboxylic groups or some hydroxyl groups. Free active hydrogen-containing groups can be provided by one or more other components in the adhesive composition, such as resorcinol formaldehyde. In some aspects, the method provides a latex polymer that includes butadiene in an amount in the range of about 65 weight percent to about 80 weight percent, styrene in an amount in the range of about 10 weight percent to about 25 weight percent, a vinylpyridine monomer in an amount in the range of about 4 weight percent to about 10 weight percent, and a monomer of Formula I in an amount in the range of 0.1 weight percent to 3.5 weight percent.

In aspects where a blend of conjugated aliphatic-vinylaromatic monomer latexes are used, the vinyl pyridine monomer is present either in a first latex polymer, and the total amount of vinyl pyridine monomer in the latexes is in an amount in the range of about 4 weight percent to about 10 weight percent, based on the total monomer weight of the latex blend. The relative amount of the first latex polymer can be adjusted in the blend to provide a vinyl pyridine monomer content in this range (~4-10 weight percent), depending on the actual amount of vinyl pyridine monomer in the first latex polymer. For example a first B-S-VP copolymer having a high VP content (e.g., 25% wt) can be used in a minor amount relative to the second latex polymer (e.g. a B-S-NMA copolymer). On the other hand, a first B-S-VP polymer having a low VP content (e.g., 5% wt) can be used in a major amount relative to the second latex polymer.

The latex polymer or polymers used to form the adhesive composition can also be formed from other monomers that are different than the ones described as the four types of monomeric components used to form the latex polymer, or polymers, described herein. In some aspects, if other monomers are included in a process to form a latex polymer, they are used at a weight percent that is lower than the conjugated aliphatic diene and the vinyl aromatic monomers, individually.

For example, a latex polymer useful for the adhesive composition can optionally include a second alternative nitrogen-containing monomer that is different than the monomer comprising a reactive N-methylol- or N-alkoxy-functionality (i.e., the first alternative nitrogen-containing monomer). Examples of second alternative nitrogen-containing monomers include acrylamide, methacrylamide, N-vinylformamide, N-vinylacetamide, ethyleneimine, 2-methylethyleneimine, 2-ethylethyleneimine, N-alkylazilydine, N-vinylpyrolidone, N-vinylpyrrole, N-vinylimidazole, N-vinylmorpholine, dimethylaminoethyl acrylate, diimethylaminoethyl methacrylate, 2-vinyl-2-oxazoline, and 2-isopropenyl-2-oxazoline.

If included in a latex polymer or polymers, in some aspects the second alternative nitrogen-containing monomer is used in an amount of about 1.0 weight percent or less, such as in the range of about 0.1 weight percent to about 1.0 weight percent, and in even more specific aspects, in the range of about 0.1 weight percent to about 0.5 weight percent.

Another optional monomer type that can be used to prepare a latex polymer or polymers is an acidic monomer, such as a carboxyl-containing monomer. Examples of carboxyl containing monomers include, but are not limited to, itaconic acid, acrylic acid, methacrylic acid, maleic anhydride, fumaric acid, and crotonic acid.

If a carboxyl-containing monomer is optionally included in the latex composition, they can be present in a single latex polymer containing the conjugated aliphatic, vinylaromatic, vinylpyridine, and nitrogen-containing monomers. Alternatively, if the composition is a blend of latex polymers and the vinylpyridine and nitrogen-containing monomers are separately present in first and second latex polymers, the carboxyl-containing monomer can be present in either or both of the first and/or second latex polymers. Yet as another alternative, a carboxyl-containing monomer can be present in a latex polymer that does not include either of the vinylpyridine or nitrogen-containing monomers.

An optional acidic monomer can be added to improve properties of the adhesive composition. For example, in addition to the nitrogen-containing monomer, the acidic monomer can further promote curing of the latex in the adhesive composition. The acidic monomer can also promote colloidal stabilization of the latex-containing compositions, particularly when the composition has a pH of about 6 or greater.

Polymerization of the monomeric components can be carried out in the presence of non-monomeric components. These non-monomeric components include, but are not limited to, polymerization initiators, polymerization activators, pH-adjusting components, buffering agents, emulsifiers/surfactants, chain transfer reagents, and chelating agents as desired. The non-monomeric components can be used in amounts as desired to promote optimal formation of the latex polymer.

Unless otherwise indicated, and unlike monomeric components, non-monomeric components are not typically consumed in the polymerization process. However, some non-monomeric components may be altered or converted to other products (e.g., subject to decomposition) during polymerization.

Non-monomeric components can be added to the polmerization mixture prior to polymerization, or some can be added to the mixture before polymerization with the remainder being added at one or more points during polymerization. The addition of non-monomeric components can increase their concentrations during polymerization, or can be replenished during the process. In other modes of practice non-monomeric components can be added continuously or discontinuously to the reactor during polymerization.

Non-monomeric components can be chosen to improve aspects of the polymerization process, such as the overall time of polymerization, the combinability of monomeric components in the polymerization mixture, and the quality or stability of the latex particle. The type and amount of non-monomeric component can be selected to optimize the polymerization process and the latex particles of the present invention.

Polymerization initiators are typically added to the initial mixture of monomeric material to drive free radical polymerization of the monomer material and formation of the latex particles. Polymerization initiators include free radical catalysts suitable for emulsion polymerization. Examples of suitable initiator classes include organic peroxides, organic hydroperoxides, inorganic persulfates, and azo compounds. Conventional redox systems generally include an organic hydroperoxide and a transition metal activator component (which may include a reductant component).

Specific examples of polymerization initiators that can be used for latex polymerization include benzoyl peroxide, di-t-butyl peroxide, t-butyl peroxyacetate, potassium persulfate, ammonium persulfate, sodium persulfate, and 2,2'-azobisisobutyronitrile. Specific examples of reducing agents that can be used in redox systems include alkali metal salts of hydrosulfites, sulfoxylates, thiosulfates, sulfites, and bisulfites.

The amount of such free radical initiators used generally ranges from about 0.01 to about 2.0 wt %, based on the weight of the total polymerization admixture. In one exemplary mode of practice potassium persulfate is used as the initiator, preferably at a concentration in the range of about 0.1 to 0.5 wt %.

The pH of the polymerization mixture can be monitored and adjusted, if desired, during the course of polymerization. pH-adjusting components, typically salts of acids or bases, can be added to the polymerization mixture to provide a desired pH. In some modes of practice, polymerization is carried out at a high pH, such as in the range of about pH 7 to about pH 13, and more specifically in the range of about pH 9 to about pH 12. The pH of the polymerization mixture can be monitored and adjusted, if desired, during the course of polymerization.

In some modes of practice, in can be desirable to end the polymerization process at a high pH, such as in the range of about 9-11, or to adjust the pH of the product to this range after polymerization. In the case wherein two or more latex polymers are blended, it may be desirable to adjust the pH of the composition prior to blending.

Exemplary bases include sodium hydroxide, potassium hydroxide, and the like. In one mode of practice, a base, such as potassium hydroxide, is mixed with a starting mixture (e.g., a seed mixture) of monomeric material, along with other non-monomeric components. In some modes of practice, the concentration of the base in the polymerization mixture is in the range of about 1 wt % to about 10 wt %. Base can be added during or after polymerization to maintain a high pH.

Polymerization of the monomeric material is typically carried out in the presence of a surfactant (emulsifier) or a combination of surfactants. For example, polymerization can include a primary surfactant, and one or more co-surfactants (e.g., secondary, tertiary, etc. surfactants).

Anionic, cationic, or nonionic surfactants can be used. Examples of suitable surfactant classes include alkyl and/or aryl carboxylates, sulfonates, or sulfates, higher fatty acid salts, dialkylsulfosuccinic acid salts, alkyl- or aryl-sulfonic acid salts, alkyl- or aryl-sulfuric acid salts and aliphatic alcohol phosphoric ester salts, oxyalkylated fatty amines, fatty acid amides, rosin acid salts, and monoalkylphenols.

Specific examples of surfactants that can be used include sodium dodecyl diphenyloxide disulfonate, sodium dodecyl sulfonate, sodium n-decyl diphenyl oxide disulfonate, isopropylamine dodecylbenzenesulfonate, triethanolamine lauryl sulfate, sodium hexyl diphenyl oxide disulfonate, sodium dodecylbenzenesulfonate, sodium laurylsulfate, sodium dioctyl sulfosuccinate, polyoxyethylene alkyl ether and polyoxyethylene alkyl-phenol ether, oxyethylated lauryl alcohol, oxyethylated oleyl alcohol, oxyethylated stearyl alcohol, dibutylsulfosuccinic acid, dioctylsulfosuccinic acid, dodecylbenzenesulfonic acid, octylbenzenesulfonic acid, sodium octylsulfate, sodium lauryl sulfate, sodium and potassium salts of natural rosin acids, and disproportionated or hydrogenated rosin acids thereof. In one mode of practice one or more of a sulfonate surfactant, such as sodium dodecyl diphenyloxide disulfonate is used, and/or a rosin acid soap is used.

The amount of surfactant used for polymerization generally ranges from about 1.0 to 15 wt %, based on the weight of the monomers. In one mode of practice surfactant is used in the range of about 3 wt % to about 10 wt %, based on the weight of the polymer.

The polymerization mixture can also include a secondary surfactant, which acts as a co-surfactant. A secondary emulsifier can enhance the stability of the latex during synthesis. The presence of a secondary surfactant can allow addition of acids, bases, or salts to the polymerization mixture without compromising the stability of the latex particle. Exemplary secondary surfactants include condensation products of formaldehyde and naphthalene sulfonates and are commercially available under the Lomar™, Tamol™, Daxad™ and Darvan™ brands. Secondary surfactants can be used in the polymerization mixture, generally at a concentration in the range of about 0.5 wt % to about 5 wt % parts by weight (of per 100 parts by weight of the latex monomer).

The polymerization mixture can include a chain transfer agent. Chain transfer agents can promote the termination and initiation of new chain growth. This can prevent the formation of very high molecular weight polymer chains, which promotes desirable latex properties.

Examples of suitable chain transfer agents include thiol compounds such as tert-dodecyl mercaptan, 2-mercaptoethanol, mercaptoacetic acid, methyl 3-mercaptopropionate, 3-mercaptopropionic acid, 3-mercapto-1-propanol, 3-mercapto-1-2-propanediol, mercaptosuccinic acid, propyl mercaptoacetate, ethyl mercaptoacetate, methyl mercaptoacetate, and dimethyl 2-mercaptomalonate. The chain transfer agent is added in an amount in the range of about 0.01 to about 0.5 wt %, and more specifically about 0.02 to about 0.15 wt %, based on the weight of monomers.

The equipment (e.g., reaction vessel) utilized for the polymerization can be a standard reactor such as one used for oil-in-water emulsion polymerizations. Suitable agitation equipment can be used along with the reaction vessel.

Any known method of emulsion polymerization can be used to prepare the latex polymer, including semi-batch, staged adiabatic, full batch, continuous, and semi-continuous processes. In one mode of practice, and as reflected in the examples, a semi-continuous process is performed. In this method, a portion of the monomers are initially polymerized from a seed mixture, and then the rest of the monomers are added to the seed mixture continuously or intermittently during the polymerization process.

First, the amount of each monomer necessary to obtain the desired composition is calculated, one or more monomer compositions are prepared (typically including one or more monomers and non-monomeric components) and the compositions are semi-continuously metered into a reaction vessel.

In one mode of practice, a seed (starting) mixture is prepared that contains the vinylaromatic monomer (e.g., styrene), a base (e.g., potassium hydroxide), urea and emulsifiers (e.g., rosin acid soap and a naphthalene-formaldehyde condensate sodium salt). The seed mixture is added to the reactor and heated (e.g., to a temperature in the range of about 100° F. to about 175° F., preferably in the range of about 135° F. to about 165° F.) and agitated.

The amount of vinyl aromatic monomer in the seed mixture can be a portion of the overall amount of vinyl aromatic monomer used to form the latex particles. For example, the seed mixture can include an amount of vinyl aromatic monomer in the range of about 10% to about 30%, or about 15% to about 25% of the total amount of vinyl aromatic monomer used to form the latex particles.

Once the seed mixture has been heated to the desired temperature and mixed, a composition including the polymerization initiator (e.g., potassium persulfate) is then added. The composition is then held at the target temperature for a period of time (such as in the range of about 10 min to about 45 min, or longer, if necessary) before the rest of the monomers are added. To the initiated seed mixture can be added one or more compositions including the remaining monomeric materials and non-monomeric materials.

In one mode of practice, a first monomer-containing composition including the vinylaromatic monomer (e.g., styrene), a vinylpyridine monomer, and a nitrogen-containing monomer comprising a reactive N-methylol- or N-alkoxy-functionality is prepared. A second monomer-containing composition including conjugated aliphatic monomer (e.g., butadiene) is then prepared. Another surfactant containing composition can be prepared. The monomer and surfactant compositions can then be independently added to the seeded polymerization mixture undergoing polymerization.

In some modes of practice, the first monomer-containing composition includes styrene, vinylpyridine, and a nitrogen-containing monomer comprising a reactive N-methylol- or N-alkoxy-functionality such as N-methylol methacrylamide, as well as a chain transfer agent such as tert-dodecyl mercaptan. Depending on the desired size of the reaction vessel and amount of latex to be produced, this composition can be fed into the reaction vessel at a suitable rate.

The second composition including butadiene can be fed into the reaction vessel at a suitable rate.

A surfactant mixture including one or more surfactants, for example, rosin acid soap and tallow fatty acid, along with addition polymerization initiator (e.g., potassium persulfate) and base (e.g., potassium hydroxide, which is added to maintain a high pH) can then be independently added to the reaction vessel at a suitable rate.

The rate of addition of the monomeric and non-monomeric compositions to the reaction vessel can vary depending on the amount of latex that is desired to be produced, and the sized of the reaction vessel.

The addition of monomeric and non-monomeric compositions is carried out over a suitable time period. The course of addition and polymerization can be chosen depending on the monomer type and amount present in the reaction mixture. For example, the preparation of latex polymers including vinyl pyridine may be carried out over longer time courses. In some modes of practice, the monomeric and non-monomeric compositions are added in their entirety over a period of time in the range of about 3 hours to about 18 hours, or more specifically in the range of about 4 hours to about 15 hours.

Since the conjugated aliphatic monomer (e.g., butadiene) is the primary monomer by weight in the formed latex polymer, the rate of addition is typically higher than the first monomer composition and the surfactant mixture. For example, the rate of addition of butadiene can be in the range of about 2 to about 3.5 times greater than the rate of addition of the styrene-containing composition, or about 0.75 to about 2 times greater than the rate of addition of the surfactant composition.

The monomers and other reagents continuously charged to the first reaction vessel undergo free-radical, emulsion polymerization to form a latex. The rate of reaction in the first vessel is controlled primarily by initiator concentration and temperature to give a steady-state, partial conversion of monomers to copolymer.

During the course of polymerization, elevated temperatures are typically used. In some modes of practice a temperature in the range of about 100° F. to about 200° F., is used, or more specifically in the range of about 125° F. to about 175° F.

In some modes of practice, it can be desirable to end the polymerization process at a high pH, such as in the range of about 9-11, or to adjust the pH of the product to this range after polymerization. In the case wherein two or more latex polymers are blended, it is desirable to adjust the pH of the composition prior to blending.

The total solids content (TSC) can be determined at one or more points during the polymerization process to monitor latex polymer formation. Total solids content is the percentage of the non-volatile material in the polymerization composition. In some modes of practice polymerization is carried out to provide a TSC at or near completion of the polymerization process in the range of about 20% to about 60%, and more specifically in the range of about 30% to about 50%.

After the latex polymerization has been completed, the reaction product mixture can be subjected to further processing. For example, the reaction product mixture, while including desired latex particles, can also include unreacted monomer or organic volatiles that may be carried over from the starting materials and/or from side reactions during polymerization. Post polymerization can be performed to reduce residual monomer by the addition of fresh free radical initiators. Alternatively, a compound such as hydroquinone can be added to the latex product to prevent further polymerization. Removal of volatiles can be carried out by stripping the reaction product mixture with steam or some other inert gas. Stripping can also remove unreacted monomer, and can be used as an alternative to, or in addition to, post polymerization.

Additional reagents can also be added after polymerization, and before, during, or after stripping. For example, base can be added to maintain a high pH in the latex reaction product. Other components can be added to stabilize the latex product, and to provide desired physical properties. For example, surfactants can be added post polymerization to stabilize the latex particles, and viscosity modifying components, such as urea, can be added to increase the viscosity of the composition.

The compositions including the latex particles formed with the vinylpyridine and nitrogen-containing monomers can be used in an adhesive composition. The adhesive composition can be applied between a rubber article and a rubber-reinforcing article.

A "rubber article," as used herein, is one formed partially or entirely rubber (also, elastomer) or rubber material. Rubbers can be formed of materials such as natural rubbers and synthetic rubbers that are capable of being cured or vulcanized. Examples of rubbers include conjugated diene homopolymers (e.g., polyisoprene, polychloroprene, polybutadiene) and copolymers, such as and copolymers of isoprene, chloroprene, butadiene with vinyl monomers (e.g., copolymers of butadiene-styrene, butadiene-acrylonitrile, and isobutylene-isoprene). Other rubber examples include ethylene-propylene copolymers and fluorocarbon-based rubbers.

Exemplary rubber articles include vehicle tires (e.g., automobile, motorcycle, bike, tractor, bus, truck and airplane tires, etc.), rubber sheets, rubber lining, belts (e.g., conveyor and engine belts), hoses (e.g., vacuum, pneumatic, oil, fuel, radiator, and water hoses), gaskets, and seals. In one mode of practice, the adhesive compositions are used to bond vehicle tires to a rubber reinforcing article, such as a fibrous rubber reinforcing material.

Rubber-reinforcing articles include any article that can be bonded to the rubber article using the latex adhesive composition. Use of a rubber reinforcing article bonded with the adhesive composition can provide a rubber product with a higher bursting and tensile strength. Rubber reinforcing article can be made of synthetic fibrous materials, and can be in the form of cords, filaments, yarns, cables, and ribbons. The rubber reinforcing article can be an unwoven fabric, or a woven fabric such as cloth.

Synthetic fibrous materials that can be used to form the rubber-reinforcing article includes, neoprene rubber, rayon, polyesters (e.g., Dacron™), mineral fibers (fiberglass), polyamides (e.g., nylon), polyvinyl alcohol, polyvinylidenes, including acrylonitrile polymers (e.g., Orlon™), polyvinyls, polyvinyl chloride, polyethylenes, polyolefins, ethylene-propylene-diene rubber (EPDM), and polyurethanes. Natural fibrous materials include alginates, cotton, cellulose acetate, and organic esters and ethers of cellulose.

An exemplary rubber reinforcing agent is a tire cord. Polyester, aramid, nylon, rayon, and other yarns, including glass fibers, are commonly used in the production of tire cord fabric. The yarns are generally twisted into configurations, and then cords are formed by combining two or more of these twisted yarns. Polyester fibers include fibers of linear polymeric polyesters, and can be produced by reacting glycols such as ethylene glycol, propylene glycol, methoxypropylene glycol with carboxylic acids. One exemplary polyester is Dacron™, which is a polyethylene glycol ester of terephthalic acid.

Polyamide fibers include synthetic fiber-forming polyamides and include, but are not limited to various nylons (nylon 6, nylon 66, nylon 610, nylon 612, etc.), including Kevlar™. The sub-generic term "glass fiber" as used herein applies to continuous glass fibers and discontinuous glass fibers in the form of filaments, strands, yarns, bundles, cords, and fabrics made of glass.

The latex polymer can be used to make an adhesive composition in the form of a dip. A "dip" refers to an aqueous or non-aqueous composition, which can be a solution, suspension, or emulsion. The dip can be applied to the rubber article or rubber-reinforcing article by dipping, spraying, or padding. Typically, after the dip is applied it is dried.

An adhesive composition formed using the latex polymer can include a resin. In some aspects, the adhesive composition includes an amount of latex polymer to resin in the range of about 20:1 (wt.:wt.) to about 2:1 (wt.:wt.).

The resin can be added to promote bonding with the rubber reinforcing material. Examples of resins that can be used in the composition include phenol-formaldehyde resins, resorcinol-formaldehyde resins, urea-formaldehyde resins, and melamine-formaldehyde resins. A water-soluble resorcinol-formaldehyde (RF) condensate can be prepared by reacting resorcinol and formaldehyde in the presence of an alkaline catalyst such as alkali hydroxide, ammonia, or amine. In one mode of practice, a condensate is obtained by reacting resorcinol and formaldehyde in a resorcinol:formaldehyde molar ratio of 1:0.5-1:2.5, or more specifically at a ratio of about 1:1.5 to 1:2.0. Since the resorcinol:formaldehyde mixing reaction is exothermic, it is typically cooled during or after the reaction.

The RF condensate can be mixed directly with an aqueous polymeric latex composition to form the adhesive composition. In some modes of practice the RF resin can be added to the polymeric latex at room temperature and then allowed to react for a certain period of time, such as in the range of about one hour to about six hours. The reaction product of the polymeric latex with the RF resin is typically referred to as a "RFL resin."

In addition to the resin (e.g., an RFL resin) the adhesive composition can optionally include one or more other additional components. Such additional components can, for example, improve bonding between the rubber and the reinforcing article, or can stabilize the adhesive composition. These additional components can be dispersing agents, protectants (such as wax), stabilizers, anti-oxidants, rubber accelerators, cross-linkers or curing agents, colorants, UV-absorbers, and vulcanizers. If it is desired to add one or more of these components, such addition can depend on the type of rubber article and rubber reinforcing article that is intended to be bonded together.

The adhesive composition can be pH adjusted to a certain range, such as in the range of above 7 to about 11. Bases, such as sodium, ammonium, or potassium hydroxide can be included in the adhesive composition. Addition of a base can also quench any unreacted formaldehyde from the resin.

If the composition is prepared as an aqueous adhesive composition, water can be present in the composition in an amount to provide a solid content in the range of about 8 wt % to about 35 wt %, with a common dip solids content of about 20 wt %.

The invention will be further described with reference to the following Examples. The Examples represent embodiments of the invention, and changes can be made to these embodiments without departing from the scope of the invention.

Dresinate™, Dowfax™ 2A1, Tamol™ SN, and tallow fatty acid emulsifiers were used for preparation of the latex polymers. Tamol™ SN is a product of Caledon Chemical Labs (Georgetown, Ontario) and contains a mixture of a naphthalene-formaldehyde condensate sodium salt (~87%), sodium sulphate (~8%), formaldehyde <0.05%, and water <7%. The rosin acid soap Callaway 8145 was obtained from Kemira (Marietta, Ga.). The anionic surfactant sodium dodecyl diphenyl oxide disulfonate Dowfax™ 2A1 was obtained from the Dow Chemical Company (Midland, Mich.). Tallow fatty acid (Callaway 8140) was obtained from Kemira (Marietta, Ga.).

BM-818 is a mixture of N-methylol methacrylamide and methacrylamide at 60%:0.5%-8% (available from Evonik, Germany)

Sulfole™-120 is the hydrophobic chain transfer agent tert-dodecyl mercaptan and was obtained from Chevron Phillips Chemical Company LP (The Woodlands, Tex.)

EXAMPLE 1

Polymerization of monomers for latex polymer formation was carried out in a 2-gallon stainless steel pressure reactor equipped with monomer addition ports, stirrer, and temperature and pressure measurement devices. Cooling was provided by an external jacket. The amounts provided below are based on a given concentration of reagent.

A seed mixture of deionized water (2505.4 g), styrene (92.4 g), potassium hydroxide (5%), Tamol SN (13.2 g), urea (5.9 g), and Rosin Acid Soap (25%) was prepared. A primary monomer mixture of styrene (370.71 g), 2-vinyl pyridine (240 g), Sulfole-120 (23.23 g), and BM-818 (79.20 g of a 60 wt % monomer composition) was prepared. A surfactant mixture of potassium hydroxide (749.76 g of a 5% solution), rosin acid soap (145.2 g of a 20% solution), tallow fatty acid (150.3 g of a 15% solution), potassium persulfate (113.14 g of a 3.5% solution), and deionized water (233.11 g) was made. A soap solution of Dowfax 2A1 (45%) was used.

The seed mixture was added to the reactor and then heated to 150° F. and agitated at 235 RPM. To the seed mixture, a solution of potassium persulfate (3.5%) in deionized water 203.7 g was then added. The mixture was held for 30 minutes at 150° F.

Monomer and surfactant mixtures were then added using a semi-continuous feed. The primary monomer mixture was added at a flow rate of 1.189 grams/min to a total amount of 713.1 g. The butadiene solution was added at a flow rate of 3.149 grams/min to a total amount of 1889.4 g. The surfactant mixture was added at a flow rate of 2.319 grams/min to a total amount of 1391.5 g. The semi-continuous feed was carried out over a time of about 10 hours (total charge time) at a reactor temperature of about 150° F.

The polymerizable mixture was then reacted in the reactor until constant solids of about 39.5%. The conversion of monomers to polymer was about 99%.

The mixture was then cooled and transferred to a stripping vessel and steam stripped or rotovaped, and then filtered in a conventional manner. The post stripping addition of water 2.6 g, potassium hydroxide (5%) 0.023 g, urea (50%) 1 g, and hydroquinone 0.1 g was performed and also no addition of posts were tested.

The formed polymer had the following percentages (by wt.) of monomers:
Butadiene—70.17
Styrene—17.5
2-vinylpyridine—9
N-methylol methacrylamide—1.8
Methacrylamide—0.25

EXAMPLE 2

Polymerization of monomers for latex polymer formation was carried out using the equipment described in Example 1.

A seed mixture of deionized water (2505.4 g), styrene (92.4 g), potassium hydroxide (15.3 g), Tamol SN (13.2 g), urea (5.9 g), and Rosin Acid Soap (314.3 g) was prepared. A primary monomer mixture of styrene (374.92 g), 2-vinyl pyridine (188.79 g), Sulfole-120 (23.50 g), and BM-818 (80.10 g of a 60% monomer composition) was prepared. A surfactant mixture of potassium hydroxide (758.28 g of a 5% solution), rosin acid soap (146.85 g of a 20% solution), tallow fatty acid (152.01 g of a 15% solution), potassium persulfate (114.43 g of a 3.5% solution), and deionized water (235.76 g) was made. A soap solution of Dowfax 2A1 (45%) was used.

EXAMPLE 3

An adhesive dip formulation was prepared from the latex of Example 1 and a resorcinol-formaldehyde resin.

A resorcinol-formaldehyde was prepared by the addition of resorcinol (16.6 parts weight), formaldehyde (5.4 parts weight dry; 14.7 parts weight wet), sodium hydroxide (1.3 parts weight), and soft water (366 parts weight). The total solids content of the resin was approximately 6.0 wt %, and the pH was approximately 9.0.

The adhesive dip formulation was prepared by combining the latex of Example 1 (100 parts weight dry; 244 parts weight wet), the resorcinol-formaldehyde resin (23.3 parts weight dry; 366 parts weight wet), and Casabond E (25 parts weight dry; 125 parts weight wet; Swan Chemical, Inc., Lyndhurst, N.J.). The total solids content of the resin was approximately 20 wt %, and the pH was approximately 10.0.

Dip coating of a polyester cord is performed at dip pick up in the range of 3.5% to 5.5%.

What is claimed is:

1. An aqueous latex adhesive composition comprising
   (1) one or more polymerization products of monomers that comprise
      (a) at least one conjugated aliphatic diene,
      (b) at least one vinyl aromatic monomer,
      (c) at least one vinyl pyridine,
      (d) a nitrogen atom-containing monomer that comprises reactive N-methylol or N-alkoxy functionality, and
      (e) optionally, an acidic monomer; and
   (2) a resin component comprising a phenol-formaldehyde resin, a resorcinol formaldehyde resin, a urea formaldehyde resin or a melamine formaldehyde resin,
   wherein said one or more polymerization products comprise a higher weight percentage units from (a) than units from (b), (c) or (d) and no more than 20 weight percent units from (c) and (d).

2. The aqueous latex adhesive composition of claim 1 wherein said composition comprises a resorcinol-formaldehyde resin.

3. The aqueous latex adhesive composition of claim 2 wherein the weight ratio of said one or more polymerization products to said resin component is from 20:1 to 2:1.

4. The aqueous latex adhesive composition of claim 1 wherein said one or more polymerization products comprise at least 55 weight percent units from (a).

5. The aqueous latex adhesive composition of claim 4 wherein said one or more polymerization products comprise from 65 to 80 weight percent units from (a).

6. The aqueous latex adhesive composition of claim 1 wherein said one or more polymerization products comprise from 10 to 40 weight percent units from (b).

7. The aqueous latex adhesive composition of claim 6 wherein said one or more polymerization products comprise from 14 to 20 weight percent units from (b).

8. The aqueous latex adhesive composition of claim 1 wherein said one or more polymerization products comprise no more than 11 weight percent units from (c) and (d).

9. The aqueous latex adhesive composition of claim 1 wherein said one or more polymerization products comprise from 4 to 15 weight percent units from (c).

10. The aqueous latex adhesive composition of claim 9 wherein said one or more polymerization products comprise from 5 to 9 weight percent units from (c).

11. The aqueous latex adhesive composition of claim 1 wherein said monomer that comprises the reactive N-methylol or N-alkoxy functionality further comprises a secondary amine group or an amide group.

12. The aqueous latex adhesive composition of claim 1 wherein said one or more polymerization products comprise from 0.1 to 3.5 weight percent units from (d).

13. The aqueous latex adhesive composition of claim 12 wherein said one or more polymerization products comprise from 1.0 to 2.5 weight percent units from (d).

14. The aqueous latex adhesive composition of claim 1 comprising two polymers, the first of said polymers comprising units from (c) and the second of said polymers comprising units from (d).

15. A method for preparing reinforced rubberized articles comprising bonding a rubber article to a rubber reinforcing article with the adhesive composition of claim 1.

16. The aqueous latex adhesive composition of claim 1 comprising a polymerization product of monomers that comprise monomers (a)-(d).

17. The aqueous latex adhesive composition of claim 16 comprising from 4 to 15 weight percent units from (c) and from 0.1 to 3.5 weight percent units from (d).

18. The aqueous latex adhesive composition of claim 17 comprising from 5 to 9 weight percent units from (c) and from 0.5 to 3.5 weight percent units from (d).

19. The aqueous latex adhesive composition of claim 17 comprising a resorcinol-formaldehyde resin.

20. The aqueous latex adhesive composition of claim 16 wherein said aqueous latex adhesive composition comprises a resorcinol-formaldehyde resin.

* * * * *